US007496363B2

(12) United States Patent
Salkintzis

(10) Patent No.: US 7,496,363 B2
(45) Date of Patent: Feb. 24, 2009

(54) METHOD OF CHANGING ACCESS POINT FOR A MOBILE NODE IN A WIRELESS ACCESS NETWORK

(75) Inventor: Apostolis K. Salkintzis, Athens (GR)

(73) Assignee: Motorola, Inc., Schaumburg, IL (US)

( * ) Notice: Subject to any disclaimer, the term of this patent is extended or adjusted under 35 U.S.C. 154(b) by 327 days.

(21) Appl. No.: 10/583,493

(22) PCT Filed: Aug. 6, 2004

(86) PCT No.: PCT/EP2004/051740

§ 371 (c)(1),
(2), (4) Date: Jun. 15, 2006

(87) PCT Pub. No.: WO2005/060165

PCT Pub. Date: Jun. 30, 2005

(65) Prior Publication Data

US 2007/0171869 A1   Jul. 26, 2007

(30) Foreign Application Priority Data

Dec. 17, 2003   (GB)   ................................. 0329245.5

(51) Int. Cl.
*H04Q 7/20* (2006.01)
(52) U.S. Cl. ...................................................... 455/436
(58) Field of Classification Search ................ 455/436, 455/550.1, 561; 370/331
See application file for complete search history.

(56) References Cited

U.S. PATENT DOCUMENTS 5,844,898 A   12/1998   Tanoue

FOREIGN PATENT DOCUMENTS

| EP | 0 851633 | 7/1998 |
| EP | 1 059 820 A2 | 12/2000 |
| EP | 0 589552 B1 | 10/2002 |
| EP | 1 345370 A | 9/2003 |
| EP | 1 418711 | 5/2004 |
| WO | WO 01/22764 A1 | 3/2001 |

OTHER PUBLICATIONS

IEEE; "IEEE Trial-Use Recommended Practice for Multi-Vendor Access Point Interoperability via an Inter-Access Point Protocol Across Distribution Systems Supporting IEEE 802.11™ Operation"; IEEE STD 802.11F; Jul. 14, 2003.
R. Braden et al., "Integrated Services in the Internet Architecture: an Overview," RFC 1633, Jun. 1994.
R. Braden et al., "Resource ReSerVation Protocol (RSVP)—Verson 1 Functional Specification", RFC 2205, Sep. 1997.

*Primary Examiner*—William D Cumming
(74) *Attorney, Agent, or Firm*—Sylvia Chen

(57) ABSTRACT

Changing access points for a mobile node (106) in a wireless access network (100), for example a wireless local area network (WLAN), includes the mobile node (106) communicating content data on an initial channel (214) via an initial access point (104) of the wireless access network (100); the mobile node (106) sending a handover request on a new channel (215) to a new access point (105) of the wireless access network (100); the mobile node (106) resuming communication of content data on the initial channel (214) via the initial access point (104); the initial access point (104) and the new access point (105) performing handover steps while the mobile node (106) resumes communication of content; and when the handover steps are completed, the mobile node (106) communicating content data on the new channel (215) via the new access point (105).

6 Claims, 3 Drawing Sheets

METHOD OF CHANGING ACCESS POINT FOR A MOBILE NODE IN A WIRELESS ACCESS NETWORK

FIELD OF THE INVENTION

The present invention relates to wireless access networks, which include wireless local area networks (WLANs) and wireless wide area networks (WWANs), and relates in particular to handovers in wireless access networks. The present invention relates in particular, but not exclusively, to handover of a mobile node (MN) between two access points (APs) under the Inter Access Point Protocol (IAPP) in a WLAN operating according to the IEEE 802.11 standard.

BACKGROUND OF THE INVENTION

Local area networks (LANs) are computer and communications networks which users may access at different access points (APs). One type of LAN is a wireless local area network (WLAN) in which user's equipment may be mobile and connects with an access point by means of a wireless link. A well known operating standard for WLANs is IEEE 802.11.

Mobile user equipment in a WLAN is usually referred to as a mobile node (MN). Some examples of an MN are a mobile telephone with a WLAN interface, a laptop computer with a WLAN interface, and a personal data assistant (PDA) with a WLAN interface.

When a MN moves, a requirement can arise for the MN to be handed over from one AP (which may be called the "initial" or "old" AP) to a "new" AP. Handover is controlled by a handover protocol. In the case of a WLAN operating according to IEEE 802.11, the handover protocol is typically the Inter Access Point Protocol (IAPP), which applies across the "initial" and the "new" AP.

The IAPP provides a means for transferring so-called "context" from the old AP to the new AP. The term context is used to describe information relating to the MN and its operation that is required at an AP for the AP to provide service to the MN. Such information may include security information such as authentication information, quality of service (QoS) information, and so on. However, in typical WLANs, and operating standards thereof, handover causes a break in service before the new AP takes over serving the MN. This may be disadvantageous, particularly when the MN is running a real-time application, e.g. a real-time multi-media application such as receiving and displaying real-time video.

In some WLANs, and operating standards thereof, so-called soft handover processes (in which two or more APs effectively serve the MN at the same time) have been applied in an attempt to alleviate the disadvantages of a break in service due to handover.

However, in many WLANs, or operating standards thereof, soft handover is not possible and/or not desirable. This is the case for WLANs operating under the IEEE 802.11 standard, in which adjacent APs typically operate in different frequency bands.

Also, a problem related to QoS provision may arise with handover of real-time applications in WLANs. In particular, where details of operating standards are based upon standards designed originally for fixed networks, a process of requesting and obtaining a required QoS level, using so-called reservation paths, tends to be problematic in WLANs where a user is allowed to change access points, essentially due to the need for re-establishing reservation paths after handover. For example, an Integrated Services (IntServ) framework, as standardized by the Internet Engineering Task Force (IETF) and discussed in R. Braden et al., "Integrated Services in the Internet Architecture: an Overview," RFC 1633, June 1994, provides a means for requesting and obtaining QoS per flow. IntServ uses Resource ReserVation Protocol (RSVP), as described in R. Braden et al., "Resource ReSerVation Protocol (RSVP)—Version 1 Functional Specification," RFC2205, September 1997, for implementing signalling associated with this. However, having been designed originally for fixed networks, RSVP is an example of a process which tends to be problematic in WLANs. In particular, depending on the distance between the peers, considerable delays can arise, deteriorating the network performance during handovers, especially for real-time applications.

Considerations such as those discussed above with respect to WLANs also apply to wireless wide area networks (WWANs). WLANs and WWANs may be considered to be two types of wireless access networks, and in this specification the term "wireless access network" is to be understood to include at least WLANs and WWANs, as well as any other access networks whose characteristics are able to benefit from the following invention.

BRIEF DESCRIPTION OF THE DRAWINGS

Embodiments of the present invention will now be described, by way of example only, with reference to the accompanying drawings, in which.

DETAILED DESCRIPTION

Broadly speaking, the disclosed call sequence provides an advantageous reduction in handover latency compared to a known method. This is achieved by virtue of a mobile node (MN) reverting to the initial access point (AP) on an initial channel after sending a message requesting a switch to a new AP on a new channel, thereby allowing content data flow to take place while the new AP, the initial AP, and (optionally) an authentication unit perform handover steps. After handover preparation in a fixed part of the WLAN is complete, or at least substantially complete, and the MN is informed of this. This tends to reduce handover latency between the old AP and the new AP and avoids breaks in service, thus improving in particular provision of real-time applications such as real-time multi-media applications.

Figure 1:
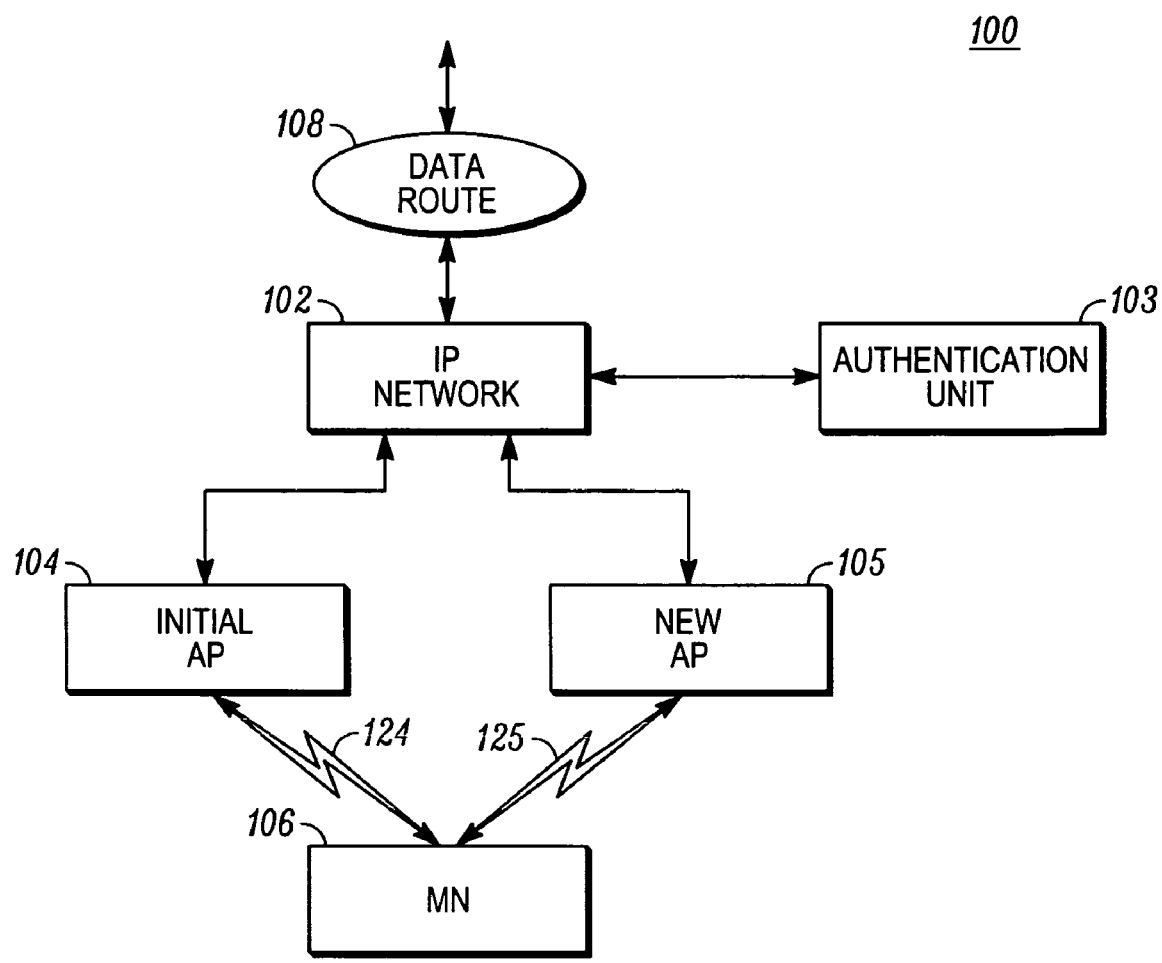
FIG. 1 is a schematic illustration of a wireless local area network (WLAN)

FIG. 1 is a schematic illustration of a wireless local area network (WLAN) 100. The WLAN 100 includes a transport network 102, which in this example is an IP network 102, coupled to an authentication unit 103 and a plurality of access points (APs). The access points are coupled, via radio links, to various mobile nodes (MNs). In practice, the WLAN 100 will typically have a large number of APs and MNs, but for clarity only two APs, namely a first AP 104 and a second AP 105, are shown and only one MN, namely MN 106, is shown. When the MN 106 is coupled to the first AP 104 this is by a radio link 124; when the MN 106 is coupled to the second AP 105 this is by a radio link 125. In this example the MN 106 is a laptop computer with a WLAN interface, but in general the MN may be any type compatible with the transport network 102, for example a mobile telephone with a WLAN interface or a personal data assistant (PDA) with a WLAN interface.

In this embodiment the WLAN 100 operates according to the well-known operating standard IEEE 802.11. As an example, the authentication unit 103 is implemented as a Remote Authentication Dial-In User Service (RADIUS) server.

The WLAN 100 allows the MN 106 to communicate with an entity via the IP network 102. Such entity may be another user node of the WLAN 100 coupled to the IP network 102 via an AP. Another possibility is that the IP network 102 may be coupled via a gateway to a public switched telephone network (PSTN), and the entity is connected via the PSTN. The type and connection route of the entity is unimportant to understanding this embodiment, and therefore in FIG. 1 and the following description this connection is presented in general terms as a data route 108 coupled to the IP network 102.

In operation, the MN 106 interacts with the IP network 102 via an access point. More particularly, let us consider a scenario where the MN 106 is engaged in a data session, and access is initially provided via, say, AP 104, which will therefore be termed hereinafter the initial AP 104. The data required to pass between various elements may be divided into data representing the information content of the data session (hereinafter referred to as content data), and signalling data used to set up and maintain the flow of the content data between elements. Content data passes between the MN 106 and the initial AP 104, between the initial AP 104 and the IP network 102, and between the IP network 102 and the data route 108. Handover-specific signalling data, including encryption data, passes between the MN 106 and the initial AP 104, between the initial AP 104 and the IP network 102, and between the IP network 102 and the authentication unit 103.

Let us now consider when it is required or desired for the MN 106's access to the transport network 102 to be changed so that it then becomes provided by a different AP, e.g. the AP 105, which will be termed hereinafter the new AP 105. The implementation of this is called handover. Conventionally, this is performed using a handover mechanism, such as the Inter Access Point Protocol (IAPP) and the IEEE 802.11 standard.

In this embodiment, the APs 104, 105 and the MN 106 have been adapted to offer, and provide for, an adapted form of access handover, as will be described in more detail below.

The adaptation may be implemented in the respective elements in any suitable manner. For example, new components may be added to conventional APs and MNs, or alternatively, existing parts of conventional APs and MNs may be adapted, for example by reprogramming of one or more processors therein. As such the required adaptation may be implemented in the form of processor-implementable instructions stored on a storage medium, such as a floppy disk, hard disk, PROM, RAM or any combination of these or other storage media. The adapted form of handover of this embodiment may be most readily understood by comparison with the conventional handover process, which is therefore described first, as follows.

Figure 2:
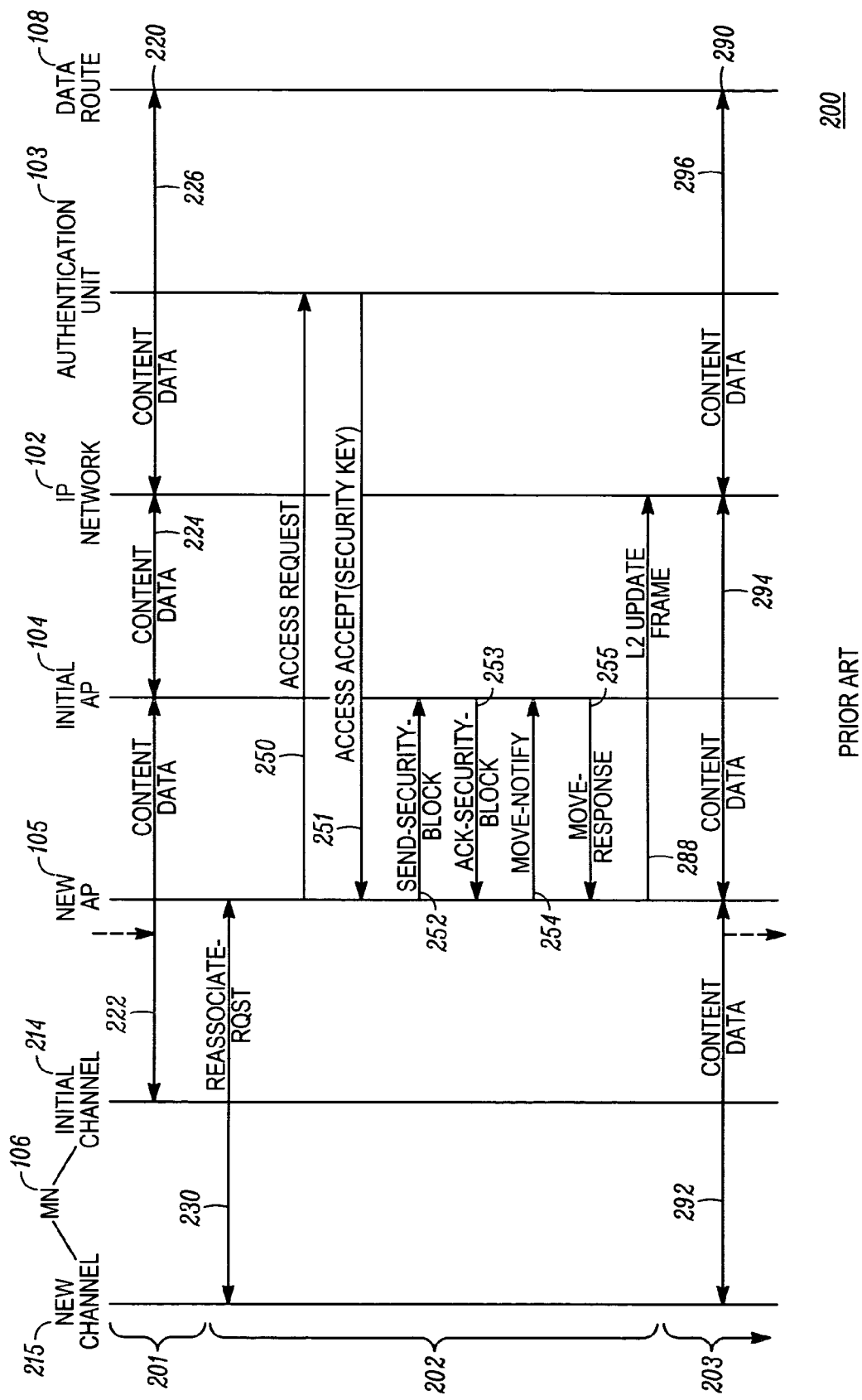
FIG. 2 is a call sequence flowchart showing process steps employed in a prior art handover process.

FIG. 2 is a call sequence flowchart 200 showing process steps employed in the prior art handover process. In the case of the MN 106, two separate radio channels are shown, an initial channel 214 which is the channel used by the MN 106 to communicate with the initial AP 104, and a new channel 215 which is the channel used by the MN 106 to communicate with the new AP 105. The channels are different radio frequencies from each other, as specified in IEEE Standard 802.11.

Initially, a data session is underway, via initial AP 104. This is represented in FIG. 2 by step 220 in which content data is passed between the MN 106 operating on the initial channel 214, the initial AP 104, the IP network 102 and the data route 108. In more detail, step 220 has: a step 222 in which content data is passed between the MN 106 operating on its initial channel 214 and the initial AP 104; a step 224 in which content data is passed between the initial AP 104 and the IP network 102; and a step 226 in which content data is passed between the IP network 102 and the data route 108. Although presented as a discrete step 220 for consistency in FIG. 2, it will be understood that this represents an ongoing two-way data flow process. This data flow process is shown in FIG. 2 as being undertaken during a first time period 201. The active channel of the MN 106 during the first time period 201 is the initial channel 214.

Then handover is performed by virtue of steps 230, 250, 251, 252, 253, 254, 255, 288 as will be described below. Steps 230, 250, 251, 252, 253, 254, 255, 288 are implemented over the course of a second time period 202, as shown in FIG. 2. The active channel of the MN 106 during the second time period 202 is the new channel 215. Thus, during the second time period 202 the flow of content data is interrupted (i.e. step 220 does not take place during the second time period), since the MN 106 has switched to its new channel 215, which corresponds to the new AP 105 rather than the initial AP 104, but the MN 106 is not yet able to send content data to or receive content data from the new AP 105.

Steps 230, 250, 251, 252, 253, 254, 255, 288 follow the protocol specified in the IEEE Standard 802.11 and the Inter Access Point Protocol (IAPP), which is a recommended practice currently standardized by the IEEE Working Group 802.11f, and is specified in IEEE Standard 802.11f/Draft 5, "Draft Recommended Practice for Multi-Vendor Access Point Interoperability via an Inter-Access Point Protocol Across Distribution Systems Supporting IEEE 802.11 Operation." The IAPP provides capabilities for transferring context from one AP to another, through the fixed distribution system, in order to facilitate handovers across multi-vendor APs. (The term "context" is used to describe information relating to the MN and its operation that is required at an AP for the AP to provide service to the MN.) The IAPP describes a service access point (SAP), service primitives, a set of functions, and a protocol that will allow conformant APs to interoperate on a common distribution system, using the Transmission Control Protocol over IP (TCP/IP, where IP is Internet Protocol) to exchange IAPP packets. Both IP in general, and more particularly TCP/IP are well known to the person skilled in the art, hence will only be briefly summarized here to the extent that, broadly speaking, they are protocols that define procedures for exchange of packetized information, and are specified in terms of different hierarchical layers, e.g. Layer 2 and Layer 3, according to different types of entities or functions needing to be consistent with each other.

Referring to FIG. 2, at step 230, the message exchange during handover is initiated by the MN 106 sending a Reassociate-Request message from its new channel 215 to the new AP 105. The Reassociate-Request message carries the Basic Service Set Identifier (BSSID) of the initial AP 104.

The new AP 105 will need to communicate with the initial AP 104. In order to do this, the new AP 105 will need the IP address of the initial AP 104. In general, mapping between BSSIDs and IP addresses can be either stored at the APs themselves, or at an authentication unit such as authentication unit 103. In this example, the mapping is held at the authentication unit. Therefore, at step 250, the new AP 105 sends an Access-Request message to the authentication unit 103, this message including the information of the BSSID of the initial AP 104.

The authentication unit 103 processes this request, including looking up the IP address of the initial AP 104 that it has mapped for the BSSID of the initial AP 104. At step 251, the authentication unit sends an Access-Accept message to the new AP 105. The Access-Accept message includes the IP address of the initial AP 104.

One option is for the communication between the APs to be encrypted or otherwise made secure. This is the case in this example. Hence, the Access-Accept message sent, at step 251, from the authentication unit 103 to the new AP 105 also includes a Security Key to enable the new AP 105 to prepare a security block for sending to the initial AP 104. Then security blocks are exchanged between the new AP 105 and the initial AP 104. This is implemented as follows. At step 252, the new AP 105 sends a Security Block to the initial AP 104. At step 253, the initial AP 104 sends a Security Block Acknowledgment to the new AP 105.

At step 254, the new AP 105 sends a Move-notify message to the initial AP 104. This Move-notify message in effect informs the initial AP 104 that the MN 106 has requested to handover to the new AP 105.

At step 255, the initial AP 104 sends a Move-response message to the new AP 105. This Move-response message and the Move-notify message each include a Context Block. Both the Move-notify message sent at step 254 and the Move-response message sent at step 255 are IP packets carried in a TCP session between the two APs 104, 105. These messages may contain authentication information that allows the new AP 105 to accept the MN 106 without re-authentication. However, the Context Block has a flexible structure which is able to support a range of information exchange. More specifically, it can consist of a variable number of Information Elements (IEs) of the form (Element ID, Length, Information). In this way, every IE can contain variable length information, whose type is specified by the Element ID. Processing of the information transferred inside the IEs is beyond the scope of the IAPP, as it depends on the functionality of the APs, and will be arranged according to the requirements or circumstances of a particular system or set up, as specified by the skilled person.

At step 288, the new AP 105 sends a Layer-2 (L2) Update Frame to the IP network 102. In response to this, the IP network 102 changes the data path to being switched via the new AP 105 instead of the initial AP 104. This is represented in FIG. 2 by a step 290 in which the content data is passed between the MN 106 operating on the new channel 215, the new AP 105, the IP network 102, and the data route 108. In more detail, step 290 includes: a step 292 in which content data is passed between the MN 106 operating on its new channel 215 and the new AP 105; a step 294 in which content data is passed between the new AP 105 and the IP network 102; and a step 296 in which content data is passed between the IP network 102 and the data route 108. Although presented as a discrete step 290 for consistency in FIG. 2, it will be understood that this represents an ongoing two-way data flow process during a third time period 203, as shown in FIG. 2.

The adapted form of handover of this embodiment will now be described with reference to FIG. 3.

Figure 3:
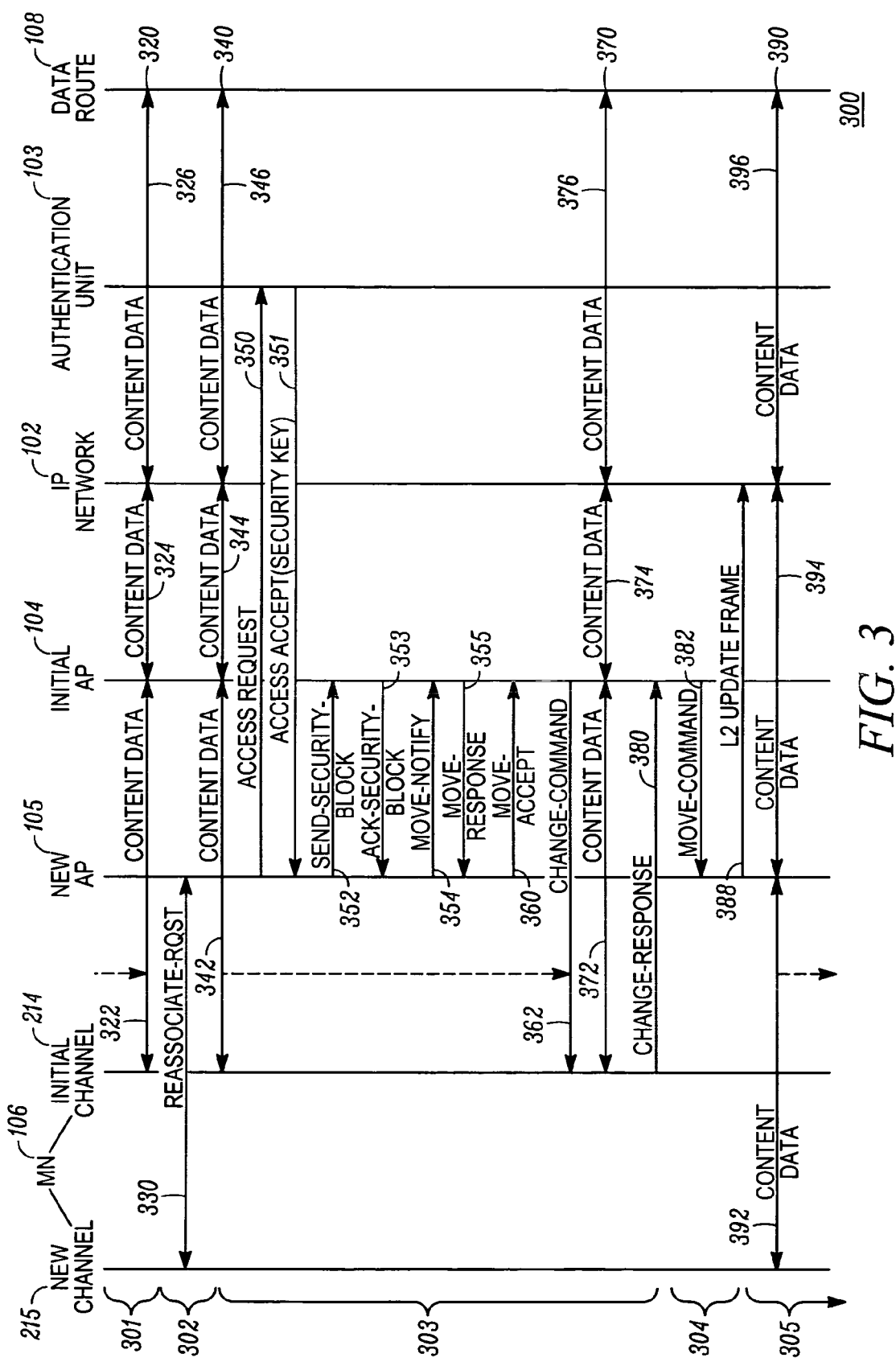
FIG. 3 is a call sequence flowchart showing process steps employed in a handover process according to an embodiment of the invention.

FIG. 3 is a call sequence flowchart 300 showing process steps employed in the handover process of this embodiment. The same reference numerals as were used with respect to FIG. 2 are used again in FIG. 3 to indicate the two separate radio channels, i.e. the initial channel 214 and the new channel 215 used by the MN 106. These channels are as described above with reference to FIG. 2.

In the process of this embodiment, each of the prior art steps described above with reference to FIG. 2 is carried out, but additional steps are now included. For the sake of completeness, the steps common to the prior art approach are renumbered and described again in the following description of this embodiment made with reference to FIG. 3. Individually, these steps corresponding to those present in the above described prior art process again follow the IEEE 802.11 standard and the protocol specified in the Inter Access Point Protocol (IAPP), which is a recommended practice currently standardized by the IEEE Working Group 802.11f, and is specified in IEEE Standard 802.11f/Draft 5, "Draft Recommended Practice for Multi-Vendor Access Point Interoperability via an Inter-Access Point Protocol Across Distribution Systems Supporting IEEE 802.11 Operation".

Initially, a data session is underway, via initial AP 104. This is represented in FIG. 3 by step 320 in which content data is passed between the MN 106 operating on the initial channel 214, the initial AP 104, the IP network 102, and the data route 108. In more detail, step 320 includes: a step 322 in which content data is passed between the MN 106 operating on its initial channel 214 and the initial AP 104; a step 324 in which content data is passed between the initial AP 104 and the IP network 102; and a step 326 in which content data is passed between the IP network 102 and the data route 108. Although presented as a discrete step 320 for consistency in FIG. 3, it will be understood that this represents an ongoing two-way data flow process. This data flow process is shown in FIG. 3 as being undertaken during a first time period 301. The active channel of the MN 106 during the first time period 301 is the initial channel 214.

Then handover is performed by virtue of steps 330, 350, 351, 352, 353, 354, 355, 360, 362, 380, 382 and 388 as will be described below. In this embodiment the implementation of these steps is conveniently considered as being divided over the course of a second time period 302, a third time period 303, and a fourth time period 304, as shown in FIG. 3 and as will be described in more detail below.

Referring to FIG. 3, at step 330, the message exchange during handover is initiated by the MN 106 sending a Reassociate-Request message from its proposed new channel 215 to the new AP 105. The Reassociate-Request message carries the Basic Service Set Identifier (BSSID) of the initial AP 104.

This step 330 is implemented over the course of the second time period 302. The active channel of the MN 106 during this second time period 302 is the new channel 215. Thus, during the second time period 302 the flow of content data is, strictly speaking, interrupted (i.e. step 320 does not take place during the second time period), since the MN 106 has switched to its new channel 215, which corresponds to the new AP 105 rather than the initial AP 104.

However, this will usually only be for a very small time compared to the prior art process, because after implementing step 330 by sending the Reassociate-Request on the proposed new channel 215, the MN 106 reverts to the initial channel 214 to resume transmission and reception of content data on the initial channel 214.

The resumed transmission and reception (flow) of content data on the initial channel 214 takes place over the course of a third time period 303. This takes place on an ongoing basis throughout the third time period 303, but for clarity is schematically represented in FIG. 3 by means of a step 340 shown at the start of the third time period 303 and a step 370 shown shortly before the end of the third time period 303. In both step 340 and step 370, content data is passed between the MN 106 operating on the initial channel 214, the initial AP 104, the IP network 102, and the data route 108. In more detail, step 340 has: a step 342 in which content data is passed between the MN 106 operating on its initial channel 214 and the initial AP 104; a step 344 in which content data is passed between the initial AP 104 and the IP network 102; and a step 346 in which content data is passed between the IP network 102 and the data route 108. Likewise, step 370 includes: a step 372 in which content data is passed between the MN 106 operating on its initial channel 214 and the initial AP 104; a step 374 in which content data is passed between the initial AP 104 and the IP network 102; and a step 376 in which content data is passed between the IP network 102 and the data route 108. The active channel of the MN 106 during the third time period 303 is the initial channel 214.

Whilst the above described data content represented by steps 340 and 370 takes place, the new AP 105, the initial AP 104, the IP network 102, and the authentication unit 103 carry out handover steps as will now be described.

In this embodiment, the mapping is again held at the authentication unit. Therefore, at step 350, the new AP 105 sends an Access-Request message to the authentication unit 103, this message including the information of the BSSID of the initial AP 104.

The authentication unit 103 processes this request, including looking up the IP address of the initial AP 104 that it has mapped for the BSSID of the initial AP 104. At step 351, the authentication unit sends an Access-Accept message to the new AP 105. The Access-Accept message includes the IP address of the initial AP 104.

In this embodiment the option for the communication between the APs to be encrypted or otherwise made secure is again employed. Hence, the Access-Accept message sent, at step 351, from the authentication unit to the new AP 105 also includes a Security Key to enable the new AP 105 to prepare a security block for sending to the initial AP 104. Then security blocks are exchanged between the new AP 105 and the initial AP 104. This is implemented as follows. At step 352, the new AP 105 sends a Security Block to the initial AP 104. At step 353, the initial AP 104 sends a Security Block Acknowledgment to the new AP 105. (Note, in other embodiments where encryption is not employed, steps 352 and 353 may be omitted.)

At step 354, the new AP 105 sends a Move-notify message to the initial AP 104. This Move-notify message in effect informs the initial AP 104 that the MN 106 has requested to handover to the new AP 105.

At step 355, the initial AP 104 sends a Move-response message to the new AP 105. This Move-response message and the Move-notify message each include a Context Block. Both the Move-notify message sent at step 354 and the Move-response message sent at step 355 are IP packets carried in a TCP session between the two APs. These messages may contain authentication information that allows the new AP 105 to accept the MN 106 without re-authentication. However, the Context Block has a flexible structure which is able to support a range of information exchange. More specifically, it can consist of a variable number of Information Elements (IEs) of the form (Element ID, Length, Information). In this way, every IE can contain variable length information, whose type is specified by the Element ID. Processing of the information transferred inside the IEs is beyond the scope of the IAPP, as it depends on the functionality of the APs, and will be arranged according to the requirements or circumstances of a particular system or set up, as specified by the skilled person.

The Move-Response message sent at step 355 is based on and includes the contents of this message that are present under conventional IAPP signalling. By virtue of this, the new AP 105 receives context information pertaining to the MN 106, which may include for example security context and Quality of Service (QoS) context. Such QoS context may include both IP Layer-2 QoS attributes, which are applicable to the WLAN radio interface, and IP Layer-3 QoS attributes, which specify end-to-end QoS requirements. Preferably a suitable Layer-2 QoS management scheme is employed, to provide for different kinds of traffic to receive acceptable service in the wireless link.

Additionally, in this embodiment, for the sake of IP Layer-3 QoS management, the Move-Response message sent at step 355 further includes an RSVP context. This RSVP context contains information about at least some, but preferably all, of the active IP flows, i.e. the data content and signal data flows being transmitted and received as part of the session. The new AP 105 might already have more current data flow than the initial AP 104, or at least relatively so compared to its capacity, due for example to other sessions of other MNs. Generally, for whatever reason, the new AP 105 may not be able to provide as much bandwidth as the initial AP 104. These situations could mean the new AP 105 would not be able to fully support the session currently previously handled satisfactorily be the initial AP 104, i.e. it might be that some of the IP data flows of the session might not be supported if handover is implemented.

The new AP 105 performs an admission control algorithm to determine which flows can be accepted, based on the RSVP information received in the Move-Response message. At step 360, the new AP 105 sends a Move-Accept message to the initial AP 104. The Move-Accept message includes the results of the admission control algorithm. At step 362, the initial AP 104 sends a Change-Command message to the MN 106 on its initial channel 214. The Change-Command message also includes the results of the admission control algorithm.

Depending on the admission control algorithm, the results can be either in the form of a simple set of flows that are accepted, implying that they will receive the same QoS level as in the old AP, or may as another possibility also contain a new set of (reduced) QoS parameters per flow, in case the new AP 105 does not have enough resources to maintain the same level of QoS support.

In this example the admission control algorithm results are acceptable to the MN 106. Hence, at step 380, the MN 106 sends an acceptance Change-Response message to the initial AP 104 on its initial channel 214. The MN 106 then switches channels to its new channel 215, awaiting communication via the new AP 105. In other words, the MN 106 has now completed its part of the handover process, and is now waiting for the new AP to start communicating with it. This constitutes the end of the third time period 303. In terms of the data content transmission and reception as represented in FIG. 3 by steps 340 and 370, it will be appreciated that step 370 represents the final data transfer on the initial channel 214.

(In the situation where the admission control algorithm results are not acceptable to the MN 106, then the MN 106 does not send the acceptance Change-Response to the initial AP, and the handover process is terminated. One possibility is to specify that in this event the MN 106 should then try to handover to another AP instead of the AP 105.)

At step 382, the initial AP 104 sends a Move-Command message to the new AP 105, which is in effect a confirmation to the new AP 105 that handover is going ahead. At step 388, in response to the Move-Command message, the new AP 105 sends a Layer-2 (L2) Update Frame to the IP network 102. Steps 382 and 388 take place during a fourth time period 304 as shown in FIG. 3. This fourth time period 304 is a time period in which the MN 106 has once again switched to its new channel 215 but is not yet in the process of passing data content on that channel.

In response to the Layer-2 (L2) Update Frame, the IP network 102 changes the data path to being switched via the new AP 105 instead of the initial AP 104. This is represented in FIG. 3 by a step 390 in which the content data is passed between the MN 106 operating on the new channel 215, the new AP 105, the IP network 102, and the data route 108. In more detail, step 390 has: a step 392 in which content data is passed between the MN 106 operating on its new channel 215 and the new AP 105; a step 394 in which content data is passed between the new AP 105 and the IP network 102; and a step 396 in which content data is passed between the IP network 102 and the data route 108. As before, although presented as a discrete step 390 for consistency in FIG. 3, it will again be understood that this represents an ongoing two-way data flow process during a fifth time period 305, as shown in FIG. 3. This fifth time period 305 is a time period in which the overall handover process has been completed and content data transfer is taking place via the new AP 105 with the MN 106 operating on its new channel 215.

Broadly speaking, this embodiment tends to provide an advantageous reduction in handover latency compared to the prior art method. This is achieved by virtue of the MN 106 reverting to the initial AP 104 on the initial channel 214 after having sent the Reassociate-Request message to the new AP 105 on the new channel 215 at step 330 during the second time period 302, thereby allowing content data flow to take place during the third time period 303 while the new AP 105, the initial AP 104 and the authentication unit 103 perform handover steps 350-362.

This can further be appreciated by the following summary of the first to fifth time periods 301, 302, 303, 304, 305, as shown in FIG. 3, from the perspective of the MN 106.

In the first time period 301, the MN 106 is communicating with the initial AP 104 on its initial channel 214, including the flow of content data.

In the second time period 302, the MN 106 is switched to its new channel 215 and is communicating a handover request, but not content data, to the new AP 105.

In the third time period 303, the MN 106 is once again communicating with the initial AP 104 on its initial channel 214, including the flow of content data.

In the fourth time period 304, the MN 106 has once again switched to the new channel 215 and is awaiting further communication with the new AP 105, i.e. no content data flows in this fourth time period 304.

In the fifth time period 305, the MN 106 is communicating with the new AP 104 on its new channel 215, including the flow of content data.

Thus, it will be appreciated that content data flow takes place in the first time period 301, the third time period 303, and the fifth time period 305, but not in the second time period 302 and the fourth time period 304. This means there are two time periods when content data flow does not take place, whereas in the prior art method of FIG. 2 there is just one time period when content data flow does not take place, namely second time period 202 of FIG. 2. However, the second time period 302 and the fourth time period 304 of the embodiment of FIG. 3 are singly and in total typically much shorter than the second time period 202 of the prior art example of FIG. 2, thus typically providing an advantageous reduction in the total time that content data flow does not take place compared to the prior art approach. This tends to allow for transmission disruption to be alleviated, which is particularly useful when the content data includes multimedia data.

The above described embodiment includes use of an RSVP context and an admission control algorithm. However, these aspects are optional, and in other embodiments are not employed. In such an embodiment which is otherwise the same as the embodiment described above, this results in the following differences compared to the above embodiment described with reference to FIG. 3:

(i) at step 355, there is no inclusion of an RSVP context in the Move-Response message;

(ii) the new AP 105 does not perform an admission control algorithm;

(iii) at step 360, there is therefore no inclusion of admission control algorithm results in the Move-accept message;

(iv) likewise, at step 362, there is therefore no inclusion of admission control algorithm results in the Change-Command message;

(v) step 380, in which the MN 106 sends an acceptance Change-Response message to the initial AP 104, will take place by default, or at least it will not be dependent upon an admission control algorithm result.

In a further modified form of any of the above described embodiments, the need for content data flow to be interrupted during the fourth time period 304 (i.e. while the Move-Command message and L2 Update Frame are sent at steps 382 and 388 respectively) may be reduced or removed as follows. In the above described embodiment, the MN 106, having sent the acceptance Change-response message on its initial channel 214 at step 380, then switches channel to the new channel and awaits completion of steps 382 and 388. In the modified version, the MN 106, having sent the acceptance Change-response message on its initial channel 214 at step 380, then remains on the initial channel 214 for a further amount of time so that content data flow may continue on the initial channel for some or all of the time it takes the other system elements to complete steps 382 and 388. This further amount of time may be a predetermined amount of time, or may be determined according to an algorithm using knowledge of previous times taken for steps 382 and 388 to be completed. Another possibility is that the MN 106 only remains on the initial channel 214 for the further amount of time if the signal quality is sufficient, i.e. above a predetermined threshold.

In the above described embodiment, the example of handover from AP 104 is given, where the AP 104 is termed the initial AP 104 as the example is described of a scenario where access is initially provided via the AP 104. It will however be appreciated that the handover process described in the above embodiment may also be applied, and forms part of the invention, when applied to an AP connection that is not necessarily the initial, i.e. first AP connection of a particular data session. In other words, for example, the above described process may equally be applied to a following handover from the new AP 105 to a further AP, not shown in FIG. 1, and so on. As such, it is to be understood that the terminology "initial AP", and likewise the terminology "initial channel", is used herein, including in the appended claims, for convenience to identify the initial AP or channel so far as the current handover process is concerned, and is not restricted to meaning the initial AP or channel so far as any other aspect, such as the current data session or call as a whole, is concerned.

In the above described embodiments, the invention is applied to a WLAN operating according to an adapted version of the IEEE 802.11 standard, and the handover process is a modified form of the Inter Access Point Protocol (IAPP). However, in other embodiments the invention may be applied to WLANs (or other access networks, see the following paragraph) operating according to any other suitable standards or protocols, including handover protocols. In this respect, it is noted that the invention is particularly advantageous when implemented in networks where so-called soft handover is not available (such as the IEEE 802.11 standard WLAN in the above embodiment). Nevertheless, the invention is still applicable to and may still be employed advantageously in other types of access network even when soft handover is in fact available. In these situations, the present invention may for example be employed when the soft handover process is either unavailable or of diminished performance, for whatever reason, or in any other form of combination or substitution with soft handover.

In the above described embodiments, the network in which the invention is applied is a WLAN. In yet further embodiments, the invention is applied to a wireless wide area network (WWAN) instead of, or in addition to, a WLAN. Generally, WLANs and WWANs may be considered as two types of access networks, and the invention may be applied to any access network.

In the above described embodiments, the WLAN includes an IP network. It will be appreciated that the IP network is just one example of types of transport networks (for example in an office block, or various office locations of an organization, or e.g. throughout an airport, and so on) to which the present invention may be applied. For example, in other embodiments the transport network may be a specific form of network, e.g. a communications network operating according to IP, for example allowing voice over IP communication.

The invention claimed is:

1. A method of changing access points for a mobile node in a wireless access network, the method comprising:
   the mobile node communicating content data on an initial channel via an initial access point of the wireless access network;
   the mobile node sending a handover request on a new channel to a new access point of the wireless access network;
   the mobile node resuming communication of content data on the initial channel via the initial access point after sending a handover request to the new access point;
   elements of the wireless access network, including the initial access point and the new access point, performing handover steps while the mobile node performs the resumed communication of content data on the initial channel via the initial access point; and
   when the handover steps are completed, the mobile node communicating content data on the new channel via the new access point.

2. A method according to claim 1, wherein mobile node resuming communication of content data on the initial channel via the initial access point ends by virtue of the mobile node switching from the initial channel to the new channel in response to an instruction message from the wireless access network which is sent as part of the handover steps performed by the elements of the wireless access network;
   the method further comprising the wireless access network sending a completion message to the mobile node informing the mobile node that the handover steps are completed; and
   the mobile node communicating content data on the new channel via the new access point starts in response to the mobile node receiving the completion message.

3. A method according to claim 2, wherein the mobile node switching from the initial channel to the new channel in response to an instruction message from the wireless access network which is sent as part of the handover steps performed by the elements of the wireless access network is performed a predetermined amount of time after the mobile node receives the completion message.

4. A method according to claim 2, wherein the mobile node switching from the initial channel to the new channel in response to an instruction message from the wireless access network which is sent as part of the handover steps performed by the elements of the wireless access network is performed a calculated amount of time after the mobile node receives the instruction message.

5. A method according to claim 1, further comprising:
   the mobile node determining whether an expected data flow of the new access point is acceptable.

6. A method according to claim 5, further comprising:
   the mobile node sending an acceptance message to the initial access point on the initial channel in response to the mobile node determining the expected data flow of the new access point is acceptable.

* * * * *